(12) United States Patent
Watanabe et al.

(10) Patent No.: US 7,727,918 B2
(45) Date of Patent: Jun. 1, 2010

(54) OPTICAL GLASS

(75) Inventors: Tomohiro Watanabe, Yokohama (JP); Taihei Mukaide, Atsugi (JP); Hidenosuke Itoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 11/932,024

(22) Filed: Oct. 31, 2007

(65) Prior Publication Data

US 2008/0131691 A1 Jun. 5, 2008

Related U.S. Application Data

(63) Continuation-in-part of application No. 11/616,716, filed on Dec. 27, 2006.

(30) Foreign Application Priority Data

Dec. 5, 2006 (JP) .............................. 2006-328745

(51) Int. Cl.
*C03C 3/085* (2006.01)
(52) U.S. Cl. ............................................ 501/69; 501/9
(58) Field of Classification Search ................ 501/9, 501/69
See application file for complete search history.

(56) References Cited

U.S. PATENT DOCUMENTS 4,664,473 A * 5/1987 Gannon ...................... 385/126
5,099,174 A * 3/1992 Coxon et al. ................ 313/623
6,645,891 B2 * 11/2003 Nagata et al. .................. 501/5
7,291,571 B2 * 11/2007 Sprenger et al. ............... 501/9
2004/0138044 A1 * 7/2004 Sakaguchi et al. ............ 501/69
2008/0132402 A1 * 6/2008 Watanabe et al. ............. 501/69
2008/0227616 A1 * 9/2008 Peuchert et al. .............. 501/67

FOREIGN PATENT DOCUMENTS

JP 2001-64038 A 3/2001

OTHER PUBLICATIONS

John H. Burnett et al., "High Index Materials for 193 nm Immersion Lithography," 5754 Proceedings SPIE 611-21 (2005).
S. H. Wemple et al., "Oxygen Octahedral Ferroelectrics: II. Electro-Optical and Nonlinear-Optical Device Applications," 40(2) J. Appl. Phys. 735-52 (Feb. 1969).

* cited by examiner

*Primary Examiner*—Karl E Group
*Assistant Examiner*—Elizabeth A Bolden
(74) *Attorney, Agent, or Firm*—Fitzpatrick, Cella, Harper & Scinto

(57) ABSTRACT

An optical glass that contains Si, Al, Mg, and O is provided. The optical glass contains Si in an amount of 40% or more and 60% or less, in cation percent, Al in an amount of 10% or more and 35% or less, in cation percent, and Mg in an amount of 20% or more and 35% or less, in cation percent. In the optical glass, the total amount of Si, Al, and Mg is 99.5% or more, in cation percent. Furthermore, the optical glass contains Fe and Na each in an amount of 0.01 wtppm or less and has a transmittance to a light having a wavelength of 248 nm of 40% or more at a thickness of 5 mm.

4 Claims, 1 Drawing Sheet

OPTICAL GLASS

This is a Continuation-In-Part Application of application Ser. No. 11/616,716, filed Dec. 27, 2006.

FIELD OF THE INVENTION AND RELATED ART

The present invention relates to an optical glass used in an apparatus including a light source emitting ultraviolet (UV) rays or vacuum UV rays, particularly an optical glass used as an optical component such as a lens, a prism, or a window member, in regions from UV rays, such as that (wavelength: 248 nm) of a KrF excimer laser, to vacuum UV rays.

In recent years, with a further integration of LSI, development of a photolithographic technology for forming a higher-resolution integrated circuit on a wafer has been required. As a means therefor, the use of a shorter-wavelength light source or an increase in a numerical aperture (N.A.) of a projection lens has been considered. As the shorter-wavelength light source, it is possible to use an $F_2$ laser (wavelength: 157 nm), an extreme ultraviolet (EUV) light source (wavelength: 13 nm), etc. Further, an immersion exposure technology in which a current ArF excimer laser is used and ultrapure water or the like is filled between the projection lens and the wafer has also been a promising technology and has received attention.

As a conventional optical component, such as a lens, a prism, or a window member, used in an apparatus employing light ranging from UV rays to vacuum UV rays, synthetic quartz glass or fluorite ($CaF_2$) having characteristics, such as a high transparency, high homogeneity, high light resistance, low light dispersion, and a low coefficient of thermal expansion, in combination, has been used.

Synthetic quartz glass is transparent to light in a wide wavelength region from a near-infrared region to a vacuum UV region and its transmittance to a light having a wavelength of 157 nm is 95% at a thickness of 1 cm. Fluorite is transparent to a light having a shorter wavelength than synthetic quartz glass and has a transmittance to the light having the wavelength of 157 nm of 99% or more at a thickness of 10 mm.

Japanese Laid-Open Patent Application 2001-64038 has disclosed a glass material comprising $SiO_2$, $Al_2O_3$, $B_2O_3$, and CaO and containing iron in an amount of 50 ppm or less. This glass material is principally used for carrying a photocatalyst used in a photocatalyst filter or the like and is required to improve a UV-ray transmitting characteristic at a wavelength of 365 nm. A transmittance in a wavelength range of approximately 310-410 nm is improved by using a high-purity starting material, preventing impurity contamination in the glass material production process, and employing a reducing agent. An action of the reducing agent is to reduce an $Fe^{3+}$ ion having an absorption peak at a wavelength of approximately 365 nm to an $Fe^{2+}$ ion having an absorption peak at a wavelength of approximately 850 nm.

However, a refractive index at a wavelength of 248 nm is 1.51 and 1.47 for synthetic quartz glass and fluorite, respectively, which have been used in the conventional exposure apparatus. Furthermore, fluorite, which is a crystal, has an intrinsic birefringence problem.

In view of these problems, evaluation of a cubic crystal including an MgO single-crystal, an $MgAl_2O_4$ single-crystal, and an $MgAl_2O_4$ polycrystal as a high-refractive index optical member for immersion exposure has been made, e.g., in John H. Burnett, Simon G, Kaplan, Eric L. Shirley, Paul J. Tompkins, and James E. Webb, "High-Index Materials for 193 nm Immersion Lithography, 5754 Proceedings SPIE 611-21 (2005).

According to the evaluation in this document, the MgO single-crystal has a refractive index of about 1.82 at a wavelength of 248 nm. The $MgAl_2O_4$ single-crystal has a refractive index of about 1.77. Therefore, these materials have sufficient refractive indices for an optical member for a UV wavelength region. Further, with respect to a transmittance at the wavelength of 248 nm, the MgO single-crystal has a transmittance of about 18% at a thickness of 9 mm, the $MgAl_2O_4$ single-crystal has a transmittance of about 80% at a thickness of 3.4 mm, and the $MgAl_2O_4$ polycrystal has a transmittance of about 72% at a thickness of 2.7 mm.

However, with respect to intrinsic birefringence at a wavelength of 253.7 nm, the MgO single-crystal has an intrinsic birefringence value of 16.0±0.5 nm/cm (extrapolation value) and $MgAl_2O_4$ single-crystal has an intrinsic birefringence value of 14.6±0.1 nm/cm (extrapolation value), thus providing much larger values than that (−0.55±0.07 nm/cm) of $CaF_2$.

In the above document, a content of iron in the glass material is 50 ppm or less in order to improve the transmittance to UV rays having a wavelength of 365 nm. In the case where the Fe content in glass is 1.0 ppm and Si containing 0.1 ppm of an impurity as a reducing agent is used in an amount of 0.01 wt. %, a transmittance at a wavelength of approximately 248 nm is about 50% at a thickness of 1 mm. In this case, however, the glass material used does not have a sufficient refractive index.

SUMMARY OF THE INVENTION

A principal object of the present invention is to provide an optical glass, which has a high refractive index and a high transmittance and which causes no intrinsic birefringence in a UV region.

As a result of trying to identify an optical member that has a high refractive index, a high transmittance, and high homogeneity and causes no problem of intrinsic birefringence, in a UV region, the present inventors have found that an optical glass that comprises $SiO_2$ and $Al_2O_3$ and to which MgO is added is effective.

According to an aspect of the present invention, there is provided an optical glass comprising Si, Al, Mg, and O, wherein the optical glass contains Si in an amount of 40% or more and 60% or less, in cation percent, Al in an amount of 10% or more and 35% or less, in cation percent, and Mg in an amount of 20% or more and 35% or less, in cation percent, a total amount of Si, Al, and Mg being 99.5% or more, in cation percent, and wherein the optical glass contains Fe and Na each in an amount of 0.01 wtppm or less and has a transmittance to a light having a wavelength of 248 nm of 40% or more at a thickness of 5 mm.

The above-described optical glass may preferably contain an OH group in an amount of 5000 wtppm or less. The above-described optical glass may preferably have a refractive index to a light having a wavelength of 248 nm of 1.57 or more.

According to the present invention, it is possible to provide an optical glass having a high refractive index and a high transmittance in a UV region.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
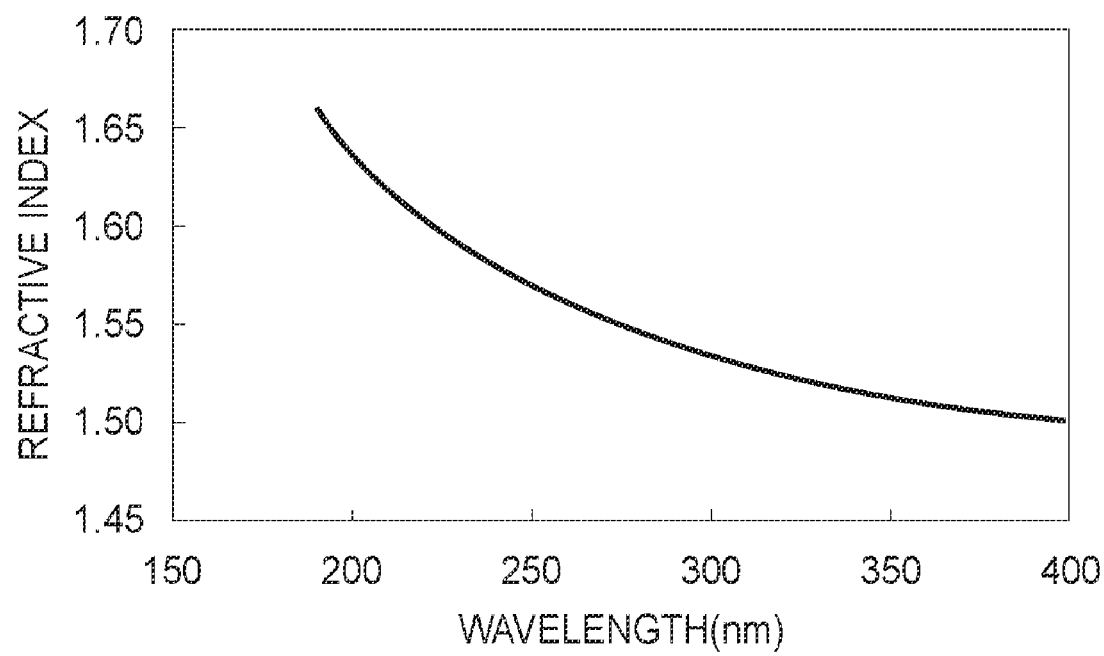
FIG. 1 is a graph showing wavelength dependence of a refractive index of the optical glass according to the embodiment of the present invention.

The present invention is described below in detail.

The optical glass according to the present invention has a higher refractive index and a higher transmittance in a UV wavelength region compared with synthetic quartz glass and fluorite.

With respect to oxides, it has been generally known that there is a correlation between a band gap and a refractive index in a visible light region. More specifically, as described in S. H. Wemple and M. DiDomenico, Jr., "Oxygen-octahedral ferroelectrics: II Electro-optical and nonlinear-optical device applications", J. Appl. Phys., vol. 40, pp. 735-752, February (1969), it has been empirically known that the following relationship is satisfied:

$$n^2-1=15/Eg,$$

wherein n represents a refractive index and Eg represents a band gap (eV).

Here, assuming that there is a similar relationship (correlation) even in wavelength regions from UV rays to vacuum UV rays, when an oxide material having a band gap that is smaller than that (Eg=approximately 9 eV, varying depending on a fictive temperature) of synthetic quartz glass and larger than 5.0 eV corresponding to energy at a wavelength of 248 nm, it is considered that a glass material having both a high refractive index and a high transmittance can be obtained. For example, MgO has a band gap of 7.6 eV and $MgAl_2O_4$ has a band gap of 7.75 eV, so that these materials satisfy this condition.

A fluorine-containing material, such as fluorite, has a large band gap, so that it is highly transparent to light of short wavelengths. However, a fluoride ion has a smaller electronic polarizability ($1.04 \times 10^{-24}$ $cm^3$) than that ($3.88 \times 10^{-24}$ $cm^3$) of an oxide ion, so that the fluorine-containing material is undesirable in terms of the high refractive index.

The present inventors have conducted studies on the basis of the above-described assumption. As a result, $SiO_2$—$Al_2O_3$—MgO-based glass prepared by adding $Al_2O_3$ (Eg=8.7 eV) and MgO (Eg=7.6 eV) to $SiO_2$ has been found. However, with respect to these glass materials (compositions), a study of high purity has been insufficient.

As described above, at the wavelength of 248 nm, synthetic quartz glass has a refractive index of 1.51 and fluorite has a refractive index of 1.47. On the other hand, the above-described $SiO_2$—$Al_2O_3$—MgO-based glass has a refractive index of 1.57 at the wavelength of 248 nm.

In a preferred embodiment, the optical glass according to the present invention is Si—Al—Mg—O based glass comprising Si, Al, Mg, and O,
wherein the optical glass contains Si in an amount of 40% or more and 60% or less, in cation percent, Al in an amount of 10% or more and 35% or less, in cation percent, and Mg in an amount of 20% or more and 35% or less, in cation percent, a total amount of Si, Al, and Mg being 99.5% or more, in cation percent, and wherein the optical glass contains Fe and Na each in an amount of 0.01 wtppm or less and has a transmittance to a light having a wavelength of 248 nm of 40% or more at a thickness of 5 mm.

The optical glass according to the present invention contains Si.

The amount of Si (Si content) contained in the optical glass according to the present invention is 40% or more and 60% or less, preferably 45% or more and 55% or less, in terms of cation %. In the optical glass of the present invention, a cation % of Si means a ratio of the ion number of a cation of Si to the sum of the ion numbers of the cations of Si, Al, and Mg, on a percentage basis. Similarly, a cation % of Al means a ratio of the ion number of a cation of Al to the sum of the ion numbers of the cations of Si, Al, and Mg, on a percentage basis. Further, a cation % of Mg means a ratio of the ion number of a cation of Mg to the sum of the ion number of the cations of Si, Al, and Mg, on a percentage basis.

$SiO_2$ is capable of forming glass by itself and is a frequently used glass component. As described above, $SiO_2$ has a band gap (Eg) of about 9 eV, so that it exhibits excellent optical transparency and light resistance with respect to UV rays and vacuum UV rays. A refractive index thereof is 1.51 at a wavelength of 248 nm, which is small. Accordingly, the Si content may preferably be increased in order to permit transmission of short wavelength light, but the increase in Si content is disadvantageous with respect to the improvement in refractive index. Further, generally, when the Si content is larger, a resultant material is liable to vitrify and has a small thermal expansion coefficient, thus having an improved stability as glass. However, the viscosity and melting point thereof are increased. This not only means an increase in the energy cost during melting, but also a limitation on a material for a vessel, such as a crucible or the like, thus resulting in an increase in production cost. Therefore, the Si content in accordance with the present invention may be in the above-described range.

The optical glass in the present invention contains Al.

The amount of Al (Al content) contained in the optical glass according to the first aspect of the present invention is 10% or more and 35% or less, preferably 12% or more and 33% or less, in terms of cation %.

It is difficult to form glass with $Al_2O_3$ alone. However, $Al_2O_3$ is a glass component for improving chemical durability that is added to a so-called glass-forming oxide, such as $SiO_2$ or the like. Further, $Al_2O_3$ has a band gap (Eg) of 8.7 eV as described above and high optical transparency with respect to UV rays and vacuum UV rays. Further, compared with $SiO_2$, $Al_2O_3$ improves the refractive index, so that Al content in accordance with the present invention is preferably in the above-described range.

The optical glass in the present invention contains Mg.

The amount of Mg (Mg content) contained in the optical glass according to the present invention is 20% or more and 35% or less, preferably 22% or more and 33% or less, in terms of cation %.

MgO functions as a so-called modifier oxide in glass formation to decrease the viscosity. As described above, MgO has an Eg of 7.6 eV, so that MgO has a larger band gap (Eg) than energy (5.0 eV) of a KrF excimer laser (wavelength: 248 nm). However, MgO is treated as an impurity, which decreases transparency to UV rays. Mg—O has a bonding energy of 88 kcal/mol, which is smaller than that (150 kcal/mol) of $SiO_2$ and that (115 kcal/mol) of $Al_2O_3$, thus resulting in low bond strength. Therefore, it is preferable to increase the MgO content from the viewpoint of increase in the refractive index. However, it is preferable to decrease the MgO content from the viewpoint of increasing optical transparency and light resistance with respect to UV rays and vacuum UV rays. Therefore, the Mg content in accordance with the present invention is preferably in the above-described range.

With respect to impurities that can be present in the optical glass according to the present invention, each of Fe and Na is contained in an amount of 0.01 wtppm or less, preferably 0.001 wtppm or less. The term "wtppm" means a weight ratio of Fe or Na to the entire weight of optical glass.

The optical glass according to the present invention is an optical member formed of glass, so that similar to synthetic quartz glass and fluorite that have been employed for the same purpose, it is preferable for the optical glass to contain as little impurity having an absorption peak in UV region as possible. More specifically, it is required in the present invention that high-purity starting materials be used and impurity contamination during the production process be reduced as much as possible.

Oxides of metal elements, examples of which may include oxides of transition metals, such as Ti or Fe, and oxides of alkali metals, such as Na or K, are principal impurities of UV and vacuum UV transmissive materials. It is desirable for these oxides to be substantially excluded from the optical glass of the present invention. Furthermore, it is also desirable to substantially exclude from the optical glass of the present invention other metal oxides having band gaps close to or lower than the UV or vacuum UV energy to be used.

Furthermore, it is desirable for the optical glasses according to the present invention to contain the OH group in an amount of 5000 wtppm or less, preferably 2000 wtppm or less, of an OH group. The OH group is present close to Mg and accelerates the destabilization of the network structure of glass. This results in a decrease in light resistance to UV rays or vacuum UV rays. For this reason, the OH group content is preferably as low as possible.

In view of the above-described characteristics of the respective components of the optical glass of the present invention, it is required that the respective contents be adjusted depending on the transmittance and refractive index at an associated wavelength.

The optical glass of the present invention may desirably have a transmittance to a light having a wavelength of 248 nm of 40% or more, preferably 50% or more, at a thickness of 5 mm.

Further, it is desirable that the optical glass of the present invention has a refractive index to a light having a wavelength of 248 nm of 1.57 or more.

As a process for producing the optical glass of the present invention, as described above, a process capable of eliminating impurity contamination is preferable. More specifically, examples of such a process may include a process in which starting materials are melted by electricity, arc plasma, or flame; a flame hydrolysis procedure; a direct process; a soot remelting process, such as vapor-phase axial deposition (VAD) or modified chemical vapor deposition (MCVD); plasma CVD; sol-gel process; and the like. In any process, it is preferable to use high-purity starting materials.

The present invention is described more specifically below based on Examples. However, the present invention is not limited thereto.

EXAMPLE 1

By using $SiCl_4$ and $O_2$ as source gas, the soot of $SiO_2$ was synthesized in a glass vessel of $SiO_2$ by a CVD apparatus to obtain A.

The thus synthesized A was immersed in a solution of $AlCl_3$ hydrate (purity: 99.9999% or more) and $MgCl_2$ hydrate (purity: 99.9999% or more) in ultrapure water and then was dried for about 12 hours in a dry nitrogen gas atmosphere to obtain B.

The thus obtained B was heated at about 2300° C. from the outside of the glass vessel by means of an oxy-hydrogen burner to melt B, followed by cooling to obtain an optical glass (material).

The thus obtained glass was in a melted state together with the glass vessel, so that a central portion was cut and optically polished to obtain a parallel flat plate having a thickness of about 5 mm.

As a result of (chemical) composition analysis using fluorescent X-ray spectroscopy, the optical glass contained Si, Al, and Mg at a ratio of Si:Al:Mg=48.7:26.9:24.4 in terms of cation % and contained Fe in an amount of 0.01 wtppm or less and Na in an amount of 0.01 wtppm or less.

The OH group concentration (content) is expected to be about 1700 wtppm.

The transmittance of the glass was measured by a visible-ultraviolet spectrophotometer.

Further, the refractive index of the glass was measured by a fast spectroscopic ellipsometer ("M-2000D", mfd. by J. A. Woollam Co., Inc.).

FIG. 1 shows a wavelength dependence of the refractive index of the glass obtained in this Example.

Figure 2:
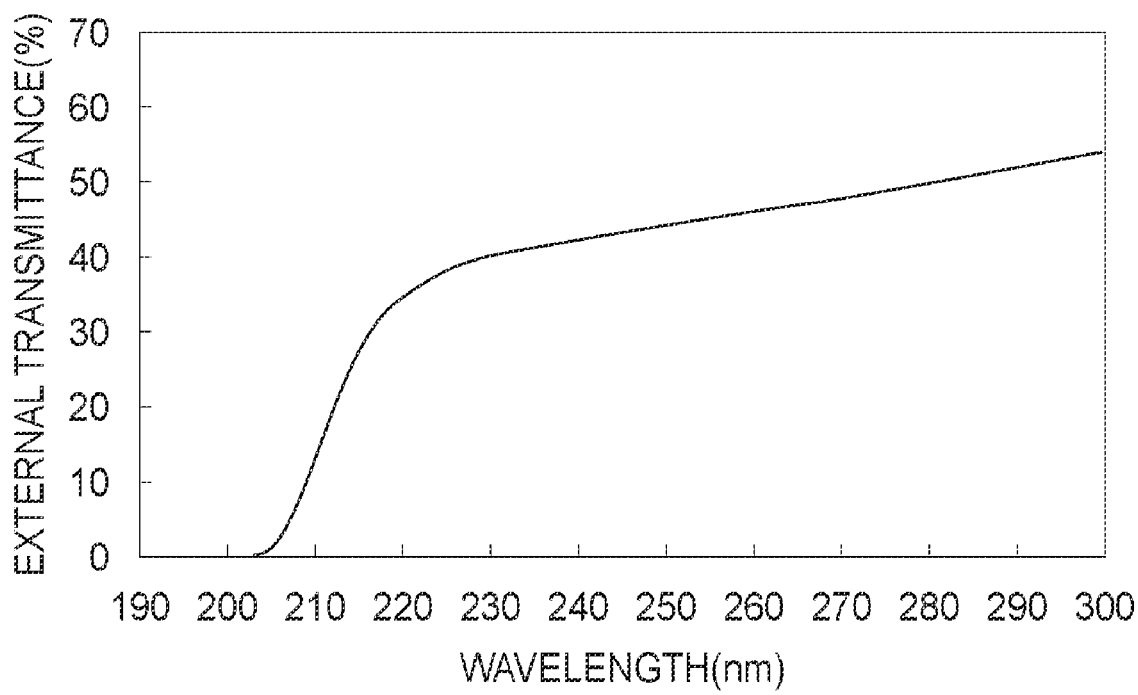
FIG. 2 is a graph showing wavelength dependence of a transmittance of an optical glass according to the embodiment of the present invention.

FIG. 2 shows a wavelength dependence of the external transmittance of the glass obtained in this Example.

The measured transmittance at a wavelength of 248 nm was 43%.

The measured refractive index at a wavelength of 248 nm was 1.57.

EXAMPLE 2

An optical glass was prepared in the same manner as in Example 1, except that the drying time for preparing the powder B was changed to 3 hours.

As a result of (chemical) composition analysis using fluorescent X-ray spectroscopy, the optical glass contained Si, Al, and Mg at a ratio of Si:Al:Mg=48.8:27.2:24.0 in terms of cation % and contained Fe in an amount of 0.01 wtppm or less and Na in an amount of 0.01 wtppm or less.

As a result of the measurement of the OH group concentration, the OH group content was about 5400 wtppm.

As a result of the measurement of an external transmittance at a wavelength of 248 nm by means of a visible-ultraviolet spectrophotometer, the measured transmittance was 38%.

Further, as a result of the measurement of a refractive index at a wavelength of 248 nm by means of a fast spectroscopic ellipsometer ("M-2000D", mfd. by J. A. Woollam Co., Inc.), the measured refractive index was 1.56.

INDUSTRIAL APPLICABILITY

As described above, according to the present invention, the optical glass has a high refractive index and high transmittance in a UV region, so that it is possible to use the optical glass as an optical part, such as a lens, a prism, a window material, and the like, in a wavelength range from UV rays to vacuum UV rays.

While the invention has been described with reference to the structures disclosed herein, it is not limited to the details set forth and this application is intended to cover such modifications or changes as may come within the purpose of the improvements or the scope of the following claims.

This application claims priority from Japanese Patent Application No. 328745/2006, filed Dec. 5, 2006, which is hereby incorporated by reference.

What is claimed is:

1. An optical glass comprising Si, Al, Mg, and O,
wherein the optical glass contains Si in an amount of 40 to 60 cation percent, Al in an amount of 10 to 35 cation percent, and Mg in an amount of 20 to 35 cation percent, a total amount of Si, Al, and Mg being at least 99.5 cation percent, and
wherein said optical glass contains Fe, Ti, K, and Na each in an amount of 0.01 wtppm or less and has a transmittance, to a light having a wavelength of 248 nm, of 40% or more in a thickness of 5 mm.

2. An optical glass according to claim 1, wherein said optical glass contains an OH group in an amount of 5000 wtppm or less.

3. An optical glass according to claim 1 or 2, wherein said optical glass has a refractive index, to a light having a wavelength of 248 nm, of 1.57 or more.

4. An optical glass comprising Si, Al, Mg, and O,
wherein the optical glass contains Si in an amount of 40 to 60 cation percent, Al in an amount of 10 to 35 cation percent, and Mg in an amount of 20 to 35 cation percent, a total amount of Si, Al, and Mg being at least 99.5 cation percent,
wherein the optical glass contains metal elements each in an amount of 0.01 wtppm or less and has a transmittance, to a light having a wavelength of 248 nm, of 40% or more in a thickness of 5 mm, and
wherein a band gap of each of oxides of the metal elements is smaller than 9.0 eV and larger than 5.0 eV.

* * * * *